No. 730,583. PATENTED JUNE 9, 1903.
H. STENDER.
AUTOMATIC FOCUSING SOLAR PRINTER.
APPLICATION FILED OCT. 3, 1900. RENEWED OCT. 13, 1902.
NO MODEL.
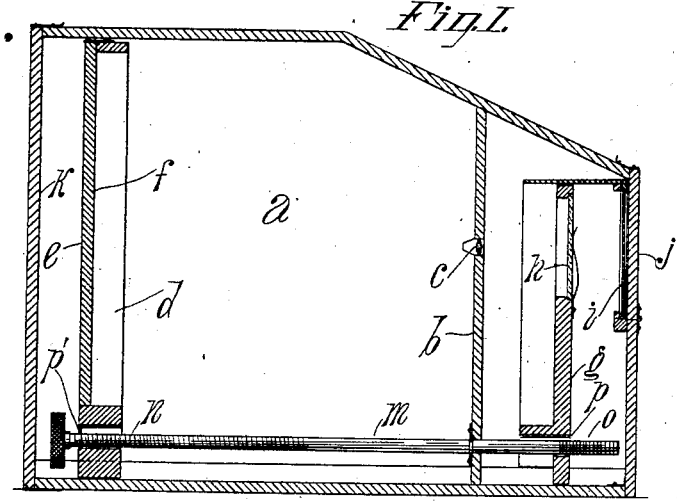
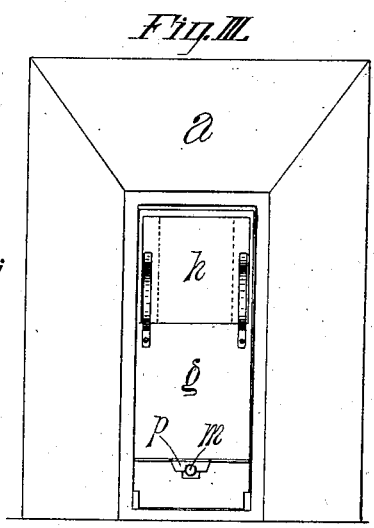
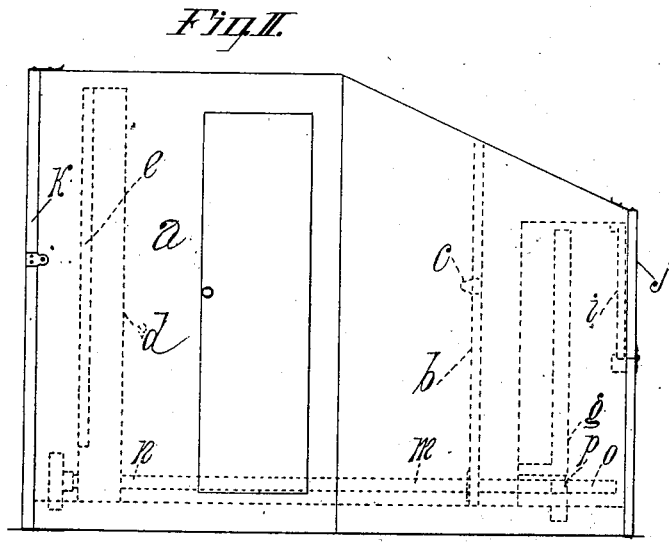
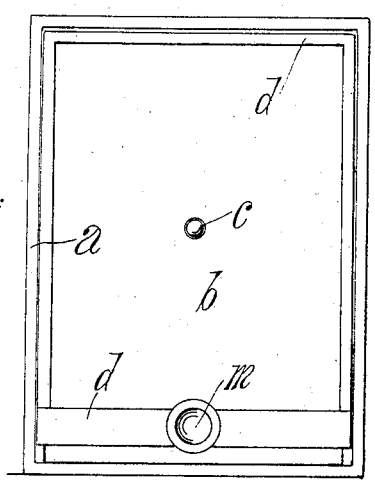
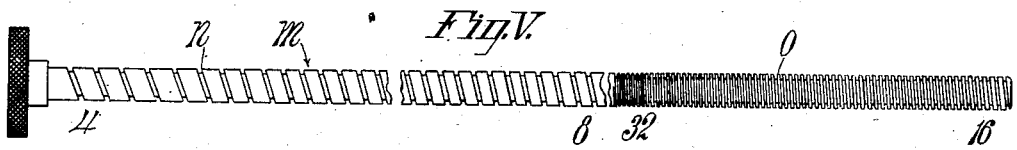
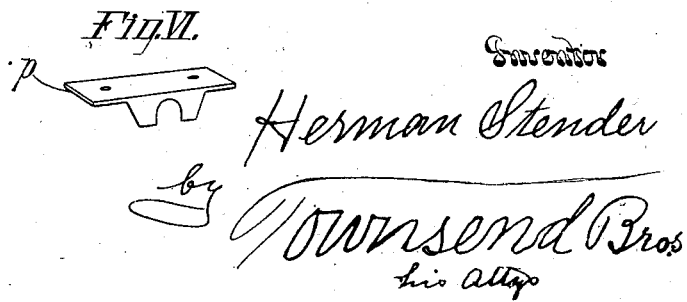
Witnesses
Inventor
Herman Stender
by Townsend Bros
his Attys
THE NORRIS PETERS CO., PHOTO-LITHO., WASHINGTON, D. C.

No. 730,583. Patented June 9, 1903.

UNITED STATES PATENT OFFICE.

HERMAN STENDER, OF LOS ANGELES, CALIFORNIA, ASSIGNOR, BY DIRECT AND MESNE ASSIGNMENTS, TO AUTOMATIC FOCUSING CAMERA COMPANY, A CORPORATION OF ARIZONA TERRITORY.

AUTOMATIC FOCUSING SOLAR PRINTER.

SPECIFICATION forming part of Letters Patent No. 730,583, dated June 9, 1903.

Application filed October 3, 1900. Renewed October 13, 1902. Serial No. 127,184. (No model.)

*To all whom it may concern:*

Be it known that I, HERMAN STENDER, a subject of the German Emperor, residing at Los Angeles, in the county of Los Angeles and State of California, have invented a new and useful Automatic Focusing Solar Printer, of which the following is a specification.

The object of my invention is to produce means whereby photographs can be printed in any desired enlarged size from a small negative by the direct rays of the sun without the exercise of any technical skill or knowledge upon the part of the printer.

By my invention I propose to enable amateur photographers with negatives made by kodaks or any other cameras to produce clear brilliant prints of any required size from a small negative.

An important object which I propose to attain by this invention is to dispense with the necessity of expensive lenses and mechanisms for the production of large photographic prints.

Another object is to enable the photographer to produce better perspective effects than have heretofore been possible in the photographic art. I propose in practice to concentrate the image from nature through as perfect a lens as possible to produce a small negative and then to enlarge the small negative thus produced by projecting the light therefrom through a perfect lens with a perfect focus onto any suitable sensitized surface to produce the desired print. By this means the correct perspective and atmospheric effects which appear in nature and which it has heretofore been found impossible to produce by printing directly from a negative from a large camera will be brought out by the enlargement from the perfect small negative.

An object of my invention is to make the enlarged print upon contact-printing paper, thereby producing an enlarged print having the appearance of being made by direct contact with the negative.

My invention depends upon the principle that the distances between the negative, the sensitized surface, and the lens change proportionately with each other to properly focus for the different degrees of enlargement.

My invention consists in furnishing the solar printer with means for automatically maintaining the appropriate relative distances between the negative, the sensitized surface, and the lens as the same are adjusted for producing prints of greater or less size.

My solar printer comprises a box furnished with a partition, a lens in the partition, a negative-holder at one side of the lens, a print-holder at the other side of the lens, and differential means for simultaneously varying the relative distances between negative-holder, print-holder, and lens. The differential means may be of any suitable character, and they may be applied to move any two of the three-named parts to bring them to the distances apart at which they are to be adjusted.

In the form shown in the drawings a differential screw is employed to move the print-holder and the negative-holder. The screw-thread which moves the print-holder is coarser than the screw-thread which moves the negative-holder, and both of said threads diminish in pitch proportionately with each other toward the lens, so that each of the holders diminishes in speed as it approaches the lens and increases in speed as it moves from the lens. It is necessary that the space between the lens and print-holder shall increase and decrease more rapidly than the space between the lens and the negative-holder, and in the form shown the speed of one holder will decrease when the speed of the other increases, and vice versa, in a common ratio.

The accompanying drawings illustrate my invention in its preferred form.

Figure I is a vertical longitudinal section of the solar printer. Fig. II is a side elevation of the solar printer. Fig. III is a front elevation, the door and ground glass being removed. Fig. IV is a rear elevation, the rear closure being omitted to receive the print-form. Fig. V is an enlarged detail of the differential screw. Fig. VI is a detail of one of the single-thread nuts for the differential screw.

$a$ indicates a solar-printer box, which is impervious to light and for economy of space is smaller at one end than at the other.

$b$ is a lens-partition in the box.

$c$ indicates a lens in the partition.

$d$ indicates a print-holder, and $e$ the form upon which the sensitized material $f$ to form the print will be placed. The lens $c$ is stationed to be on a line with the center of the sensitized material $f$ when the same is in position.

$g$ indicates the negative-holder at the opposite side of the partition and lens from the print-holder.

$h$ indicates a negative in the negative-holder.

$i$ indicates ground glass at the negative end of the box.

$j$ indicates a door to exclude light from the ground glass and to be opened to expose the negative to the light.

$k$ indicates a door or cap at the rear end to allow the print-holding form $e$ with the print $f$ thereon to be placed on the print-holder.

$l$ indicates a side door opening into the box between the print and the lens to allow inspection of the print in case printing-out paper is employed. When the closures $j$, $k$, and $l$ are closed, the box is impervious to light.

$m$ indicates a differential screw furnished with a coarse thread $n$ at one end and a fine thread $o$ at the other end. Each of these threads proportionately diminishes in pitch toward the lens $c$.

$p$ indicates the single-thread nut of the negative-holder, and $p'$ indicates the single-thread nut of the print-holder.

The length and pitch of the two threads of the differential screws will depend upon the capacity of the lens. In a printer for printing a sixteen-by-twenty-inch print from a four-by-five-inch negative employing a small lens the thread for moving the print-holder will be, say, about twelve inches long, and its coarser end will be about four pitch at about twenty-one inches from the lens and will diminish to about eight pitch at the other end of said thread. This is indicated by the characters 4 and 8 in Fig. V. The thread for moving the negative-holder will then be about three inches long and the pitch will increase from thirty-two to sixteen pitch in that length, as indicated by the characters 32 and 16 in Fig. V. The focus distances vary uniformly for any lens, but vary differently with different lenses. Consequently the differential screws are not always alike for a given size of lens.

The rule for determining the pitch of the threads relative to the lens and the work to be performed by the printer is as follows: The negative-holder will first be stationed at the position for the largest picture to be taken, and the print-holder will be stationed at its station for the largest picture, and when a perfect focus is produced from the negative through the lens onto the print-form $e$ these points are marked, the one being the inner end of the negative-holder-moving thread and the other being the outer end of the print-holder-moving thread. Then the print-form $e$ and negative-holder are set in focus for the smallest size of print desired, and this point will be marked as determining the inner end of the print-holder-moving thread and the outer end of the negative-holder-moving thread. Then one thread is cut to convenience, diminishing regularly in pitch from end to end toward the lens. The other thread is then cut from end to end the same number of turns, the pitch diminishing toward the lens in proportion with the first thread. Then the holder-moving nuts $p$ $p'$, being fastened to their respective holders, will be applied to their respective threads, the print-holder nut being at the outer end of the print-holder-moving thread when the negative-holder nut is at the inner end of the negative-moving thread. Then when the differential screw $m$ is turned the negative-holder will be moved away from the lens with an increasing speed and the print-holder will be moved toward the lens at a speed decreasing proportionately with the speed of the negative-holder, and the focus will be maintained throughout the entire movement of the negative-holder and the lens-holder from end to end of their respective threads, so that no skill and no inspection whatever is required for producing the exact focus.

In practice to produce a large print from a small negative the negative will be put in position and the differential screw will be turned to bring the holders to the points to produce the enlargement desired. Then the printer will be taken into a dark room, the sensitized material will be placed upon the form $e$ therefor, and said form will be fastened in position in the holder $d$. Then the closures $k$ and $j$ will be closed, and the printer will be taken to the light and directed toward the sun or other requisite light source, and the exposure is then made by opening the door $j$ for the determined length of time. The printer will then be taken to the dark room, and the print can then be handled and developed in the manner customary for the treatment of sensitized paper.

Any character of sensitized paper or other sensitized material may be used, and the results obtained, in so far as the printing is considered, will be substantially the same as with contact-printing with the same paper or material.

What I claim, and desire to secure by Letters Patent of the United States, is—

1. A solar printer comprising a box furnished with a partition; a lens in the partition; a negative-holder at one side of the lens; a print-holder at the other side of the lens; and a differential screw for simultaneously varying the distances between negative-holder, print-holder and lens.

2. A solar printer comprising a box furnished with a partition; a lens in the partition; a negative-holder at one side of the lens; a print-holder at the other side of the lens; and a differential screw for simultaneously operating the negative-holder and print-holder for varying the distances between negative-holder, print-holder and lens.

3. A solar printer comprising a box furnished with a partition; a lens in the partition; a negative-holder at one side of the lens; a print-holder at the other side of the lens; and a differential screw furnished with a coarse thread diminishing in pitch toward the lens for moving the print-holder toward and from the lens, and also furnished with a fine thread diminishing toward the lens for moving the negative-holder toward and from the lens.

4. The combination with a solar-printer lens, negative-holder and print-holder, of a differential screw for moving the negative-holder and print-holder, the pitch of the threads respectively diminishing toward the lens, and the negative-holder thread being of less pitch than and proportionate with the pitch of the print-holder-moving thread.

In testimony whereof I have signed my name to this specification, in the presence of two subscribing witnesses, at Los Angeles, California, this 24th day of September, 1900.

HERMAN STENDER.

Witnesses:
JAMES R. TOWNSEND,
JULIA TOWNSEND.